United States Patent
Blanchet et al.

(10) Patent No.: US 10,532,497 B2
(45) Date of Patent: Jan. 14, 2020

(54) VULCANIZING MOULD WITH ENHANCED SEALING

(71) Applicant: COMPAGNIE GENERALE DES ETABLISSEMENTS MICHELIN, Clermont-Ferrand (FR)

(72) Inventors: Etienne Blanchet, Clermont-Ferrand (FR); Thomas Lescur, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 16/064,949

(22) PCT Filed: Nov. 30, 2016

(86) PCT No.: PCT/FR2016/053152
§ 371 (c)(1),
(2) Date: Jun. 21, 2018

(87) PCT Pub. No.: WO2017/109315
PCT Pub. Date: Jun. 29, 2017

(65) Prior Publication Data
US 2019/0009434 A1    Jan. 10, 2019

(30) Foreign Application Priority Data
Dec. 22, 2015  (FR) .................................. 15 63145

(51) Int. Cl.
*B29D 30/06* (2006.01)
*B29C 33/00* (2006.01)

(52) U.S. Cl.
CPC ...... *B29C 33/0038* (2013.01); *B29D 30/0629* (2013.01); *B29D 2030/0616* (2013.01)

(58) Field of Classification Search
CPC ............ B29D 30/0606; B29D 30/0629; B29D 2030/0607; B29C 33/0038
See application file for complete search history.

(56) References Cited

U.S. PATENT DOCUMENTS

| | | | |
|---|---|---|---|
| 3,609,819 A | 10/1971 | Searle | |
| 4,772,194 A * | 9/1988 | Pizzorno | B29C 33/0038 249/134 |
| 5,269,669 A * | 12/1993 | Ladouce | B29D 30/0629 249/57 |

(Continued)

FOREIGN PATENT DOCUMENTS

| | | |
|---|---|---|
| EP | 0 522 374 | 1/1993 |
| EP | 0 983 833 | 3/2000 |

(Continued)

*Primary Examiner* — James P Mackey
(74) *Attorney, Agent, or Firm* — Cozen O'Connor

(57) ABSTRACT

A mould (10) for a tire, comprising two shells (30) that are each intended to mould a lateral sidewall of the tire, a ring of sectors (20) intended to mould a tread of the tire, each sector (20) of the ring of sectors comprising a radially inner face (21) having a moulding lining (22). The mould (10) has microstructures (50) that are designed to fill a clearance between two moulding linings (22) of adjacent sectors (20) and/or between a moulding lining (22) of one sector (20) and a shell (30), when the mould is closed.

12 Claims, 8 Drawing Sheets

(56) References Cited

U.S. PATENT DOCUMENTS 6,517,333 B1 * 2/2003 Mas .................... B29C 33/0038
425/28.1

FOREIGN PATENT DOCUMENTS

| | | |
|---|---|---|
| FR | 2 087 540 | 12/1971 |
| FR | 2 678 862 | 1/1993 |
| JP | 2009 202441 | 9/2009 |

* cited by examiner

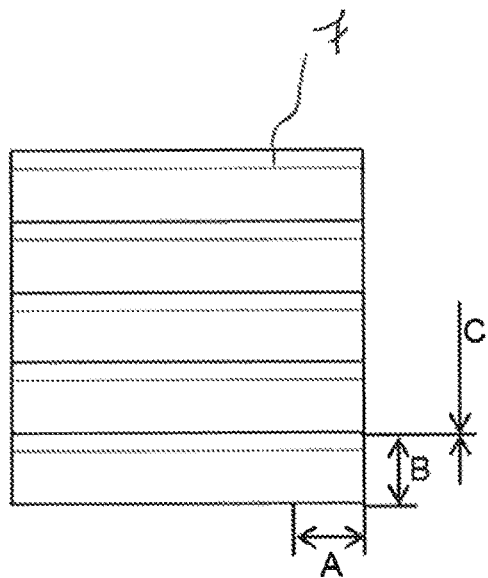
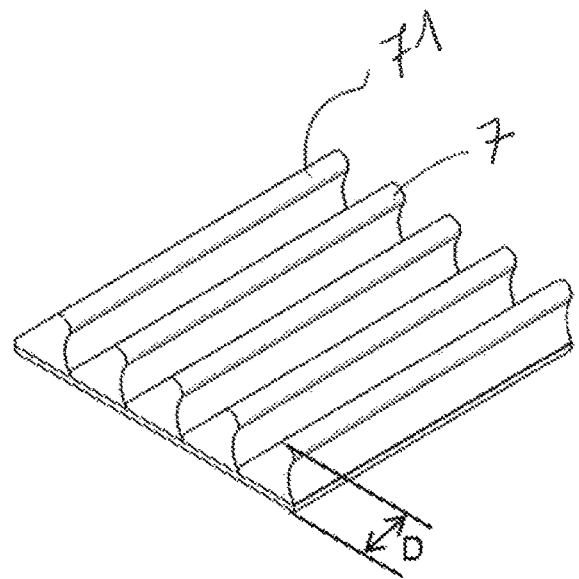
FIG. 7a
FIG. 7b
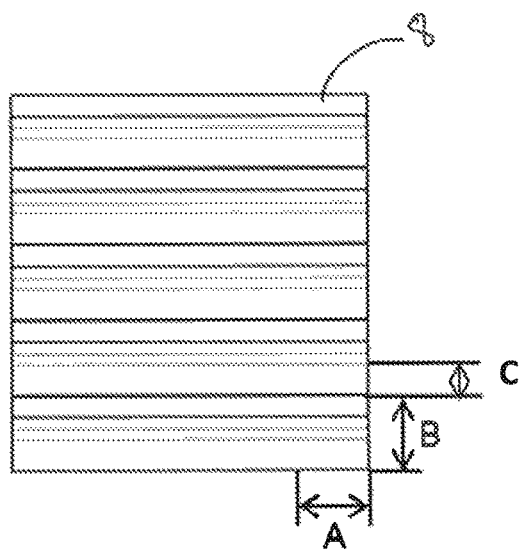
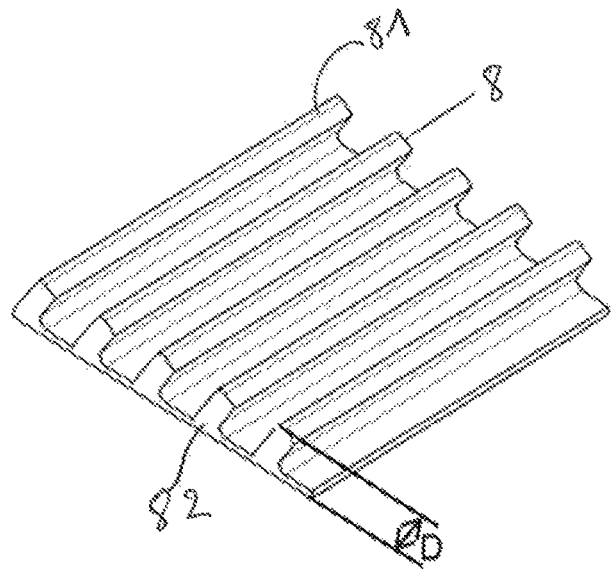
FIG. 7c
FIG. 7d

VULCANIZING MOULD WITH ENHANCED SEALING

RELATED APPLICATIONS

This is a U.S. National Phase Application under 35 USC 371 of International Application PCT/FR2016/053152 filed on Nov. 30, 2016.

This application claims the priority of French application no. 1563145 filed Dec. 22, 2015, the entire content of which is hereby incorporated by reference.

FIELD OF THE INVENTION

The invention relates to the field of moulds for tires, in particular moulds of the sectored type.

BACKGROUND OF THE INVENTION

A sectored mould generally has two lateral shells for moulding the sidewalls of the tire, and several peripheral sectors, situated between the shells, for moulding the tread of the tire. The tread is moulded more precisely by linings comprising patterns of the tire. These moulding linings are attached and fastened to the inner face of each sector or formed integrally.

During vulcanization, with the green blank of the future tire being firmly pressed and held against the mould, said green blank is subjected to certain pressure and temperature conditions which cause the raw rubber compound to become fluid. Thus, very good sealing of the mould is necessary to avoid the appearance of flash on the tire during curing.

However, in practice, the closure of a vulcanizing mould over a plurality of faces at the same time and with a clearance between different parts of less than 0.03 mm is difficult to achieve on the sectored moulds known from the prior art.

One solution to this problem is proposed by the patent EP0522374. That patent proposes a sectored mould that also comprises lateral ring segments fastened to the sectors. In the closed position of the mould, the sectors are in contact with one another via said segments, which also ensure contact between the sectors and the shells. Thus, by exerting elastic compression on the ring segments by pressing them against one another, the clearance between parts can be reduced, this then reducing the risk of the appearance of flash on the tire.

However, the ring segments have to be manufactured separately, fitted and then fastened to each sector, thereby making the manufacture of the mould more complex. Moreover, this solution requires a large number of additional parts comprising the ring segments and the fastening parts, thereby making it expensive to manufacture the mould.

SUMMARY OF THE INVENTION

One object of the invention is to provide a sectored vulcanizing mould which makes it possible to solve the problem of sealing while remaining easy to manufacture and inexpensive.

To this end, one aspect of the invention is directed to a mould for a tire, comprising two shells that are each intended to mould a lateral sidewall of the tire, a ring of sectors intended to mould a tread of the tire, each sector of the ring of sectors comprising a radially inner face having a moulding lining, the mould being characterized in that it has microstructures that are designed to fill a clearance between two moulding linings of adjacent sectors and/or between a moulding lining of one sector and a shell, when the mould is closed.

The vulcanizing mould according to embodiments of the invention thus has microstructures arranged in the zones in which there is a clearance between the linings of adjacent sectors and/or between the linings of the sectors and each shell. During the closure of the mould, the microstructures of one component of the mould, for example the microstructures formed on a lining of one sector, deform under the effect of the stresses exerted by the microstructures of another, adjacent, component of the mould, by a lining or by a shell. By deforming, said microstructures fill the clearance at their location in the mould. In this way, the problems of sealing of the vulcanizing moulds are eliminated and the formation of moulding flash on the tires is consequently avoided.

Moreover, this solution is simple and inexpensive, since it does not require separate manufacture of additional elements or the fitting and fastening of these additional elements. The microstructures can be manufactured at the same time as the linings, thereby allowing a further time saving and thus a reduction in manufacturing costs.

Advantageously, the deformation of the microstructures is plastic deformation.

According to a first embodiment, the microstructures are arranged in a contact zone between two linings of adjacent sectors and are secured to at least one of said linings of sectors. This makes it possible to fill the clearance between linings of adjacent sectors.

According to a second embodiment, the microstructures are arranged in a contact zone between a lining of a sector and a shell and are secured to the lining of the sector and/or to the shell. The contact zone between linings of sectors and the shell is also referred to as the interlocking zone. The presence of microstructures in this interlocking zone on each of the linings of sectors, on the shell or both on the linings of sectors and the shell makes it possible to fill any clearance in this interlocking zone.

Advantageously, the microstructures are produced by laser sintering. The laser sintering technique makes it possible to produce the microstructures at the same time as the linings are produced, this therefore allowing a time saving.

Advantageously, said microstructures are produced on a perimeter of the moulding lining.

Advantageously, the microstructures are attached and fastened to the mould by fastening means. The advantage of having attached microstructures is that it is possible to replace these microstructures without replacing the linings. This makes it possible to make savings.

Advantageously, the microstructures are fastened by microwelding.

Alternatively, the microstructures are obtained by the technique referred to as laser metal deposition (LMD).

Advantageously, the microstructures are designed to adapt to the profile of the clearance between two linings of adjacent sectors and/or between a lining of a sector and a shell. This thus makes it possible to ensure that the clearance between linings of adjacent sectors and/or between linings of sectors and the shell is filled properly.

According to a first exemplary embodiment, the microstructures are designed, on account of their shape, to be compressed under the effect of a stress. The shape of said microstructures is, for example, one of spikes, pyramids, squares and domes.

According to a second exemplary embodiment, the microstructures are designed, on account of their shape, to bend under the effect of a stress. The shape of said microstructures is, for example, one of curved strips, kinked strips and inclined strips.

BRIEF DESCRIPTION OF THE DRAWINGS

The invention will be understood better from reading the following description of preferred embodiments which are given by way of non-limiting illustrative example, with reference to the drawings, in which:

FIG. 1a shows a partial section through a vulcanizing mould known from the prior art;

FIGS. 7a to 7d, 8a, 8b and 9a, 9b illustrate examples of microstructures in the form of strips that are deformable by bending.

DETAILED DESCRIPTION OF THE DRAWINGS

Figure 1B:
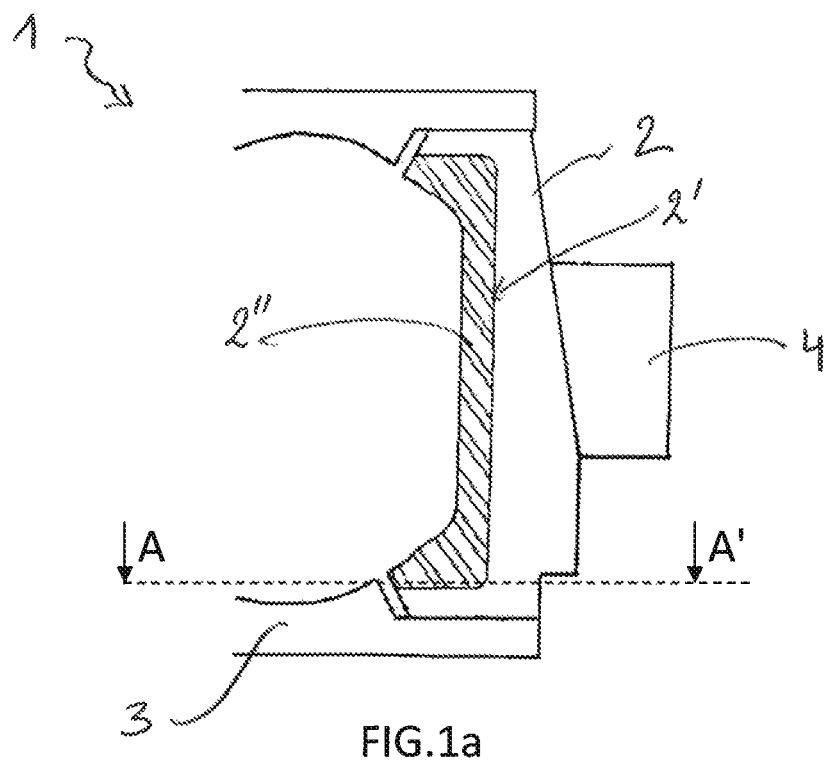
FIGS. 1b and 1c illustrate the types of clearance that exist when the mould shown in FIG. 1a is closed.
Figure 1B:
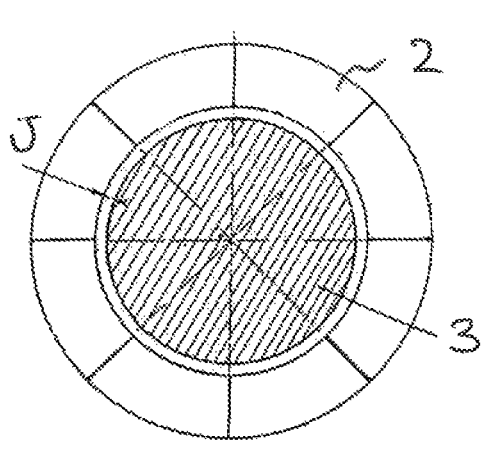

FIG. 1a shows a partial view of a section in a meridian plane through a sectored mould 1 for a tire, known from the prior art. The mould 1 comprises a set of sectors 2 that form a ring of sectors, and two shells 3, one being the lower shell and the other the upper shell. Each sector 2 of the ring of sectors comprises a radially inner face 2' having a moulding lining 2". The mould 1 also has a belt 4 which serves to keep the sectors 2 together when the mould 1 is closed.

FIG. 1b is a section, on the axis AA' shown in FIG. 1a, which illustrates a first closed configuration of the mould 1, in which closure occurs first of all by contact between adjacent sectors 2 and in which there is a clearance J between the ring of sectors 2 and the shell 3, more specifically at the interlocking circle.

Figure 1C:
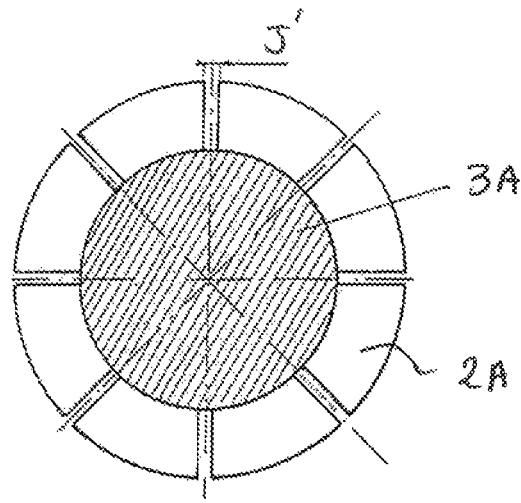

FIG. 1c is likewise a section on the axis AA' shown in FIG. 1a, which illustrates a second closed configuration of the mould 1, in which closure takes place first of all by contact of the type sector 2A/shell 3A and in which there is a clearance J' between adjacent sectors 2A.

Figure 2A:
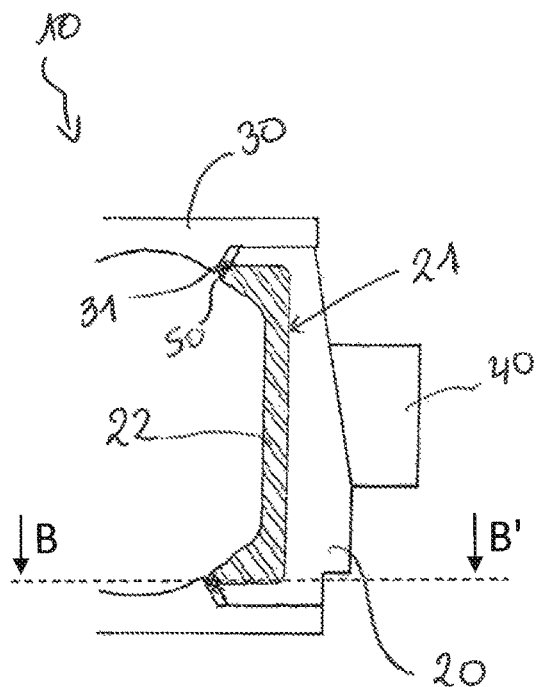
FIGS. 2a to 2d illustrate a mould according to a first exemplary embodiment of the invention, comprising microstructures between sectors and the shell.

FIG. 2a shows a partial view of a section in a meridian plane through a sectored mould 10 for a tire, in accordance with a first exemplary embodiment of the invention. The mould 10 comprises a set of sectors 20 that form a ring of sectors, and two shells 30, one being the lower shell and the other the upper shell. Each sector 20 of the ring of sectors comprises a radially inner face 21 having a moulding lining 22. The mould 1 also has a belt 40 which serves to keep the sectors 20 together when the mould 10 is closed.

Each sector 20 also comprises microstructures 50 arranged on the linings 22 in a zone of contact with the shell 30. The shell 30 also comprises microstructures 31 arranged on said shell in a zone of contact with the sectors 20.

Figure 2B:
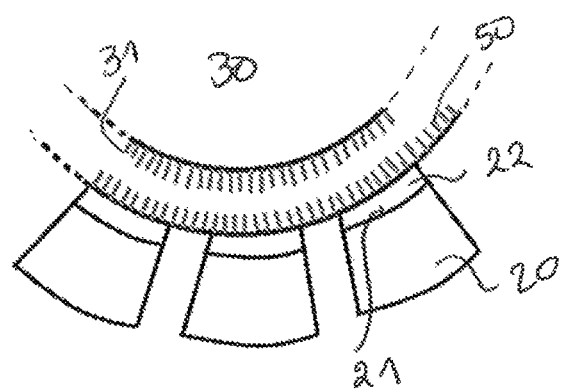
Figure 2C:
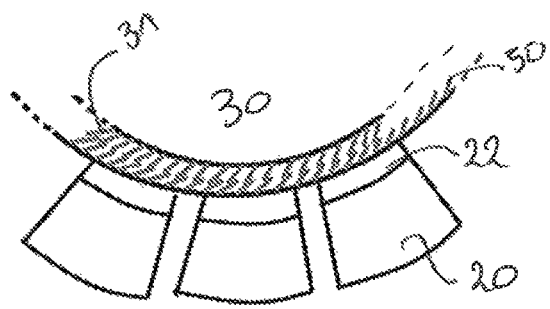
Figure 2D:
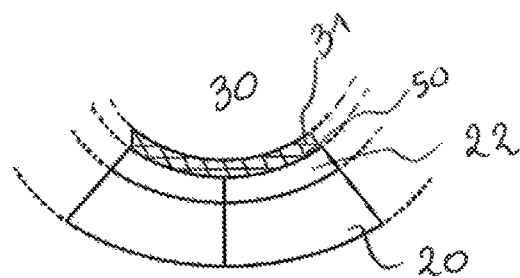

FIGS. 2b to 2d are partial views of sections on the axis BB' shown in FIG. 2A.

The mould 10 as shown in FIG. 2b is open. FIG. 2c shows the mould 10 while it is being closed. In this case, the sectors 20 have been moved towards one another, but are not yet in full contact. The microstructures 50 and 31 have started to rub against one another.

In FIG. 2d, the mould 10 is completely closed, the sectors 20 are in contact with one another, as in the case illustrated in FIG. 1b. The microstructures 31, 50 have been deformed and have filled the clearance J10 between the sectors 20 and the shell 30.

In a variant that is not shown, the mould 10 has only the microstructures 31 arranged on the shell 30.

In another variant that is likewise not shown, the mould 10 has only the microstructures 50 arranged on the lining 22 of each sector 20.

According to yet another variant, the lining 22 of the sector 20 is made up of several parts.

Figure 3A:
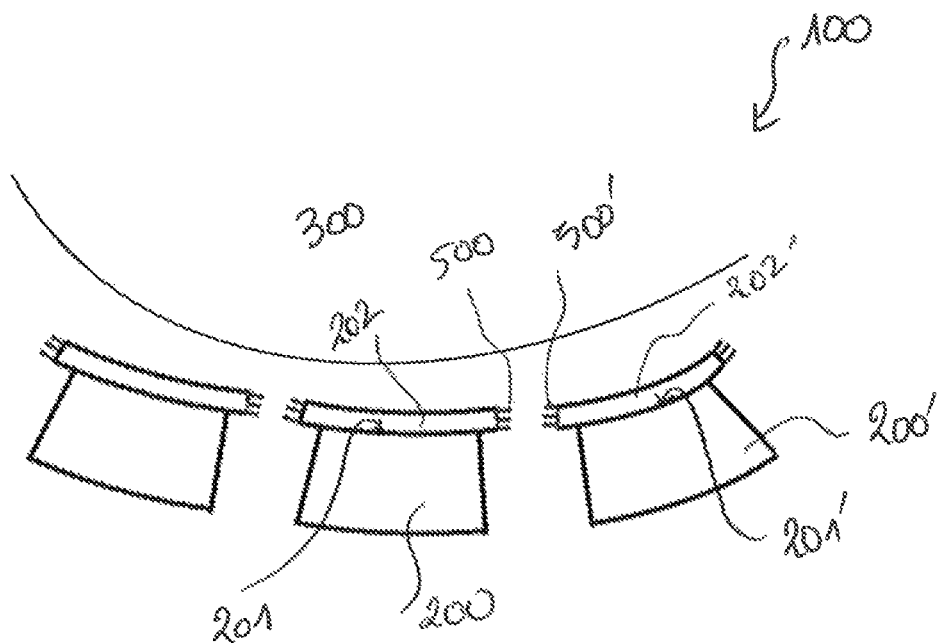
FIGS. 3a and 3b illustrate a mould according to a second exemplary embodiment of the invention, comprising microstructures between adjacent sectors.
Figure 3B:
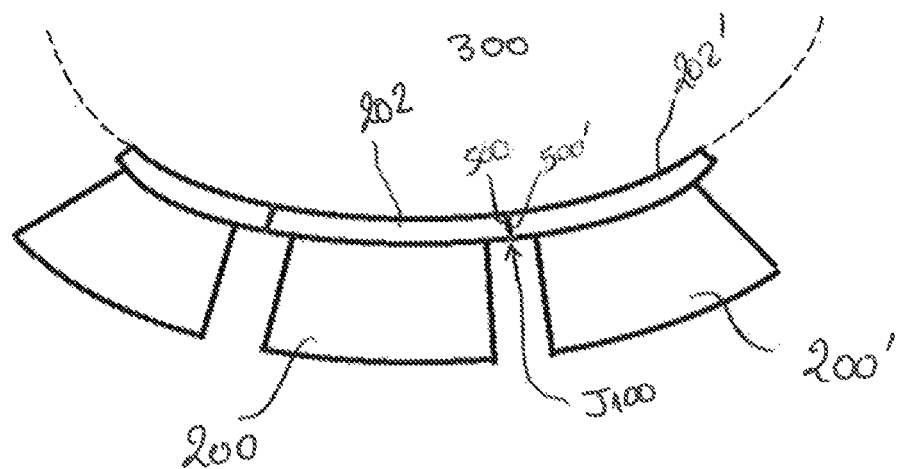

FIGS. 3a and 3b are partial views of sections, similar to the section shown in FIG. 1c, through a mould 100 according to a second exemplary embodiment of the invention. The mould 100 is substantially identical to the mould 10 described above with reference to FIGS. 2a to 2c and comprises a set of sectors 200, 200' that form a ring of sectors 200, 200', and two shells 300. Each sector 200, 200' comprises a lining 202, 202' arranged in the radially inner face 201, 201' of the sector 200, 200'.

However, in this case, each sector 200 also comprises microstructures 500 arranged on the lateral face of the lining 202 in a zone of contact with a lining 202' of a sector 200' adjacent to the sector 200. The sector 202' likewise has microstructures 500' arranged on the lateral face of the lining 202' in a zone of contact with the lining 202 of the sector 200.

In FIG. 3A, the mould 100 is open and the sectors 200, 200' are separated from one another.

In this configuration, the mould is closed as in the example shown in FIG. 1c, that is to say, first of all by contact between the shell 300 and sectors 200, 200', and then by each sector 200, 200' coming into contact with its neighbours via the linings 202, 202'. In this case, the microstructures 500 of the sector 200 rub against the microstructures 500' of the neighbouring sector 200'.

FIG. 3b corresponds to a situation in which the mould 100 is completely closed, the linings 202, 202' of the sectors 200, 200', respectively, are in contact with one another and the microstructures 500, 500' have been deformed and have filled the clearance J100 between the sectors 200 and 200'.

In a variant that is not shown, each sector has microstructures on only one lateral face of the lining such that, during closure, there is contact between the lining of one sector and the microstructures of a neighbouring sector, said microstructures filling the clearance between the two sectors.

In another variant, which is likewise not shown, one sector in two has microstructures.

In the example illustrated in FIGS. 3a and 3b, each sector 200, 200' has a single lining 202, 202', that is to say one formed by a single element. FIGS. 4a to 4d show variant embodiments in which the sector 2000; 2001; 2002; 2003 has an assembly of linings. In each of FIGS. 4a to 4d, the state A1, A2, A3 or A4 corresponds to the state of the elements of the linings before being fitted on the sector 2000; 2001; 2002; 2003 and the state B1, B2, B3 or B4 corresponds to the state of the linings after being fitted on the sector 2000; 2001; 2002; 2003.

Figure 4A:
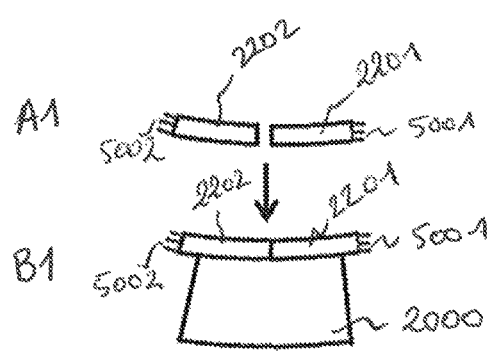
FIGS. 4a to 4d illustrate variants of the mould illustrated in FIGS. 3a and 3b.
Figure 4C:
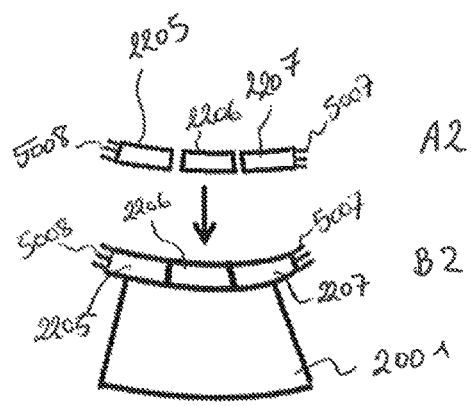
Figure 4B:
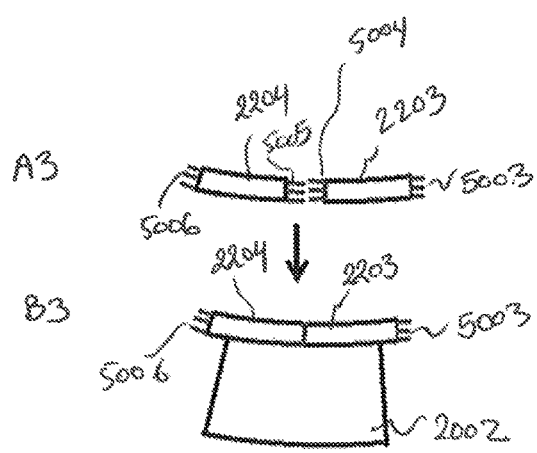

In the case in FIGS. 4a and 4b, the assembly of linings is formed by two lining elements 2201, 2202, 2203 and 2204.

Figure 4D:
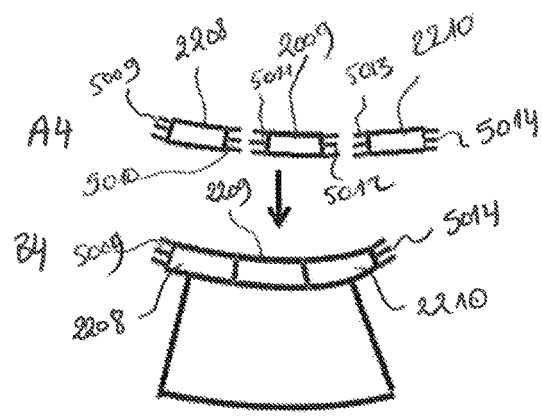

In the case in FIGS. 4c and 4d, the assembly of linings is formed by three lining elements 2205, 2206, 2207, 2208, 2209, 2210.

In the variants illustrated in FIGS. 4a and 4c, only the outer lateral faces of the assembly have microstructures 5001, 5002; 5007, 5008, these microstructures 5001, 5002; 5007, 5008 being intended to fill the clearance with respect to another lining of an adjacent sector.

The variants illustrated in FIGS. 4b and 4d differ from the variants illustrated in FIGS. 4a and 4c, respectively, in that each lining 2201, 2203; 2208, 2209, 2210 has microstructures 5003, 5004, 5005, 5006; 5009, 5010, 5011, 5012, 5013, 5014 on its two lateral faces. In this way, in addition to filling the clearance between linings of adjacent sectors, the clearance between the lining elements 2203, 2204; 2208, 2209, 2210 of the same sector 2002; 2003 is likewise filled by the microstructures 5004, 5005; 5010, 5011, 5012, 5013.

According to one variant, the number of linings per sector is greater than three.

According to another variant embodiment, the microstructures are arranged both between linings of sectors, as described with reference to FIGS. 3a and 3b or 4a to 4d, and between linings of sectors and the shell, as described with reference to FIGS. 2a to 2c.

Figure 5A:
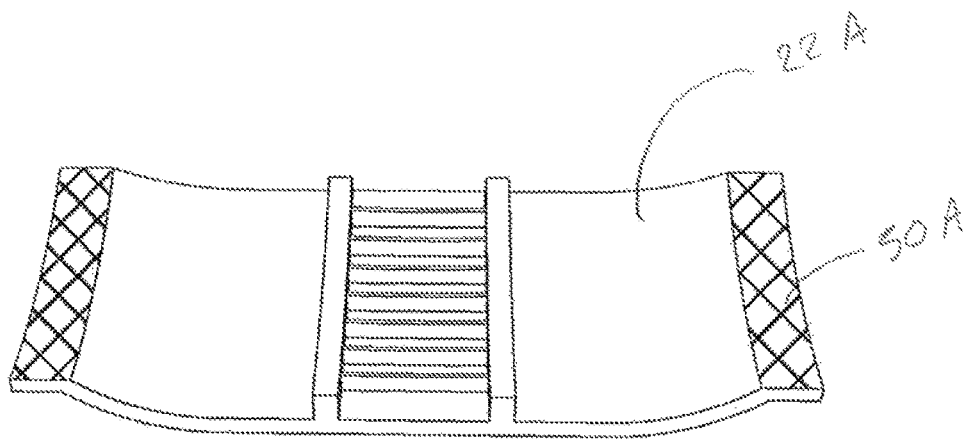
FIGS. 5a to 5c illustrate possible locations of the microstructures on a lining of a sector according to an embodiment of the invention.
Figure 5B:
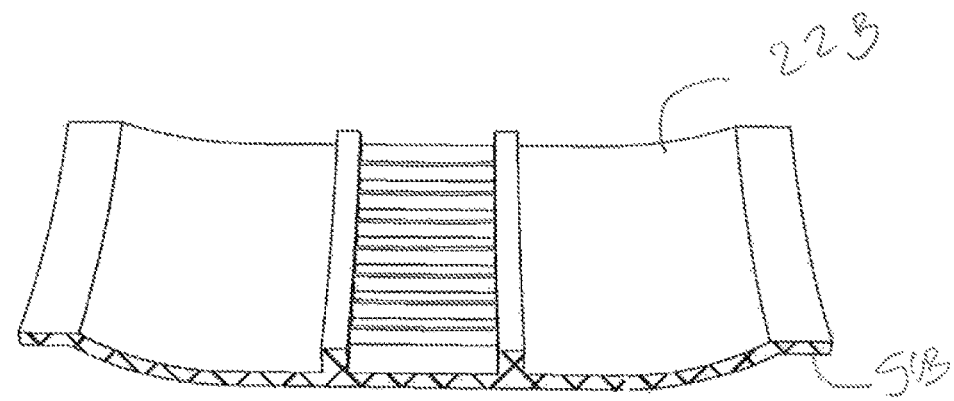
Figure 5C:
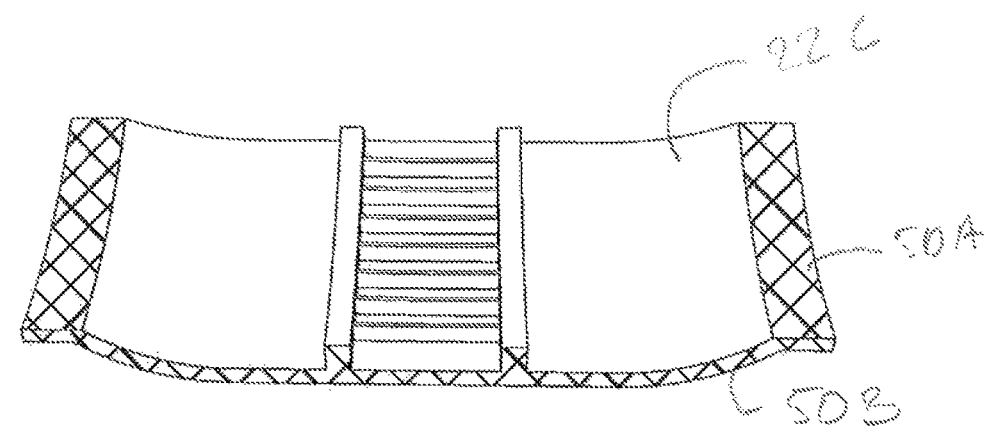

FIGS. 5a to 5c show an example of a lining of a sector of a mould for a tire according to the invention. In FIG. 5A, the lining 22A has microstructures 50A in the zone of contact with a shell (not shown in FIGS. 5a to 5c). In FIG. 5b, the lining 22B has microstructures 50B a zone of contact with the lining of another sector. In FIG. 5c, the lining 22C has microstructures 50A in the zone of contact with a shell and 50B a zone of contact with the lining of another sector.

According to one variant, the sectors do not have (a) lining(s) and the microstructures are arranged between adjacent sectors and/or between sectors and the shell. In this case, the moulding part of a sector is, for example, cut directly into the sector, by machining. The moulding part can also be manufactured on an existing sector by selective laser melting (SLM) and microstructures are then added directly to the sectors and/or shells.

Figure 6A:
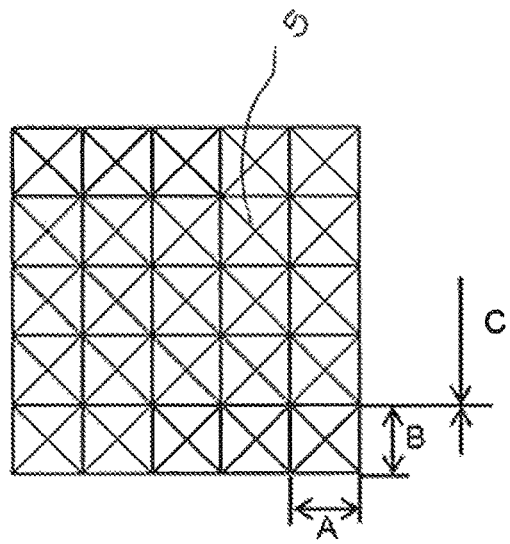
FIGS. 6a to 6d illustrate examples of microstructures that are deformable by compression.
Figure 6B:
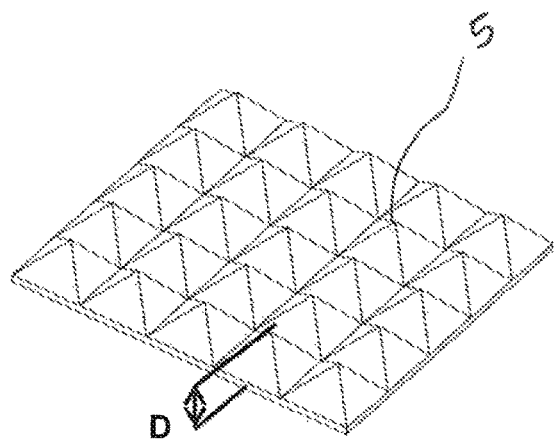

FIGS. 6a and 6b show a top view and a side view, respectively, of a set of microstructures 5 according to a first exemplary embodiment. In this example, the microstructures 5 are pyramid-shaped, where each pyramid is characterized by a length A, a width B and a height D. The pyramids are spaced apart by a distance C.

Figure 6C:
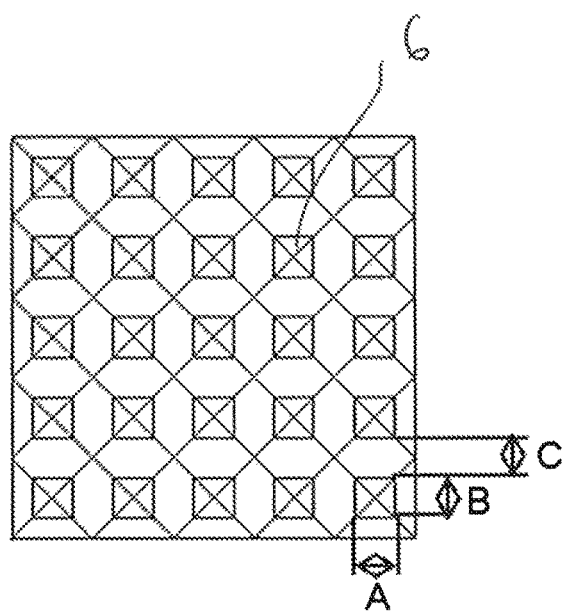
Figure 6D:
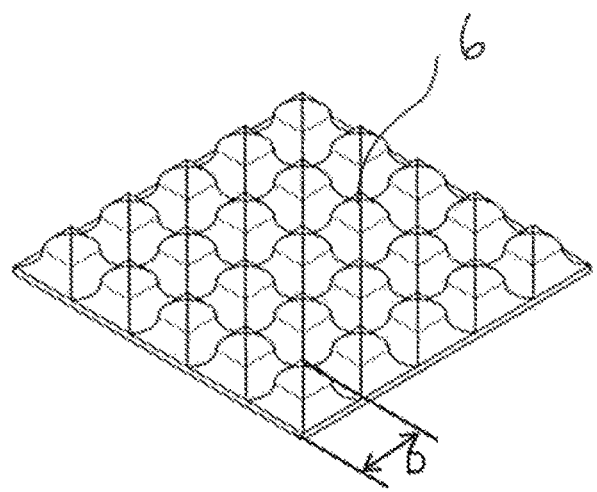

FIGS. 6c and 6d show a top view and an isometric view, respectively, of a set of microstructures 6 according to a second exemplary embodiment. In this example, the microstructures 6 have a shape corresponding substantially to a stack of an upper pyramid on a lower pyramid of larger size. Said upper and lower pyramids have curved faces. Each microstructure is characterized by a length A, a width B and a height D. The set of microstructures 6 is likewise characterized by a spacing C between microstructures 6.

The microstructures 5, 6 described above with reference to FIGS. 6a to 6d are deformed plastically by compression under the effect of a stress.

FIGS. 7a and 7b show a top view and an isometric view, respectively, of a set of microstructures 7 according to another exemplary embodiment. In this example, the microstructures 7 have the form of inclined strips with an upper part 71 with a rounded shape. Each microstructure 7 is characterized by a length A, a width B of the base 72 of the strip and a height D. Each strip is spaced apart from an adjacent strip by a distance C.

FIGS. 7c and 7d show a top view and an isometric view, respectively, of a set of microstructures 8 according to a variant of the inclined strips illustrated in FIGS. 7a and 7b. The difference resides in the fact that, in this case, the strips have a narrower base 82 and a rectangular and non-rounded upper part 81.

In the same way as for the microstructures 7, each microstructure 8 is characterized by a length A, a width B and a height D. Each strip is spaced apart from an adjacent strip by a distance C.

Figure 8A:
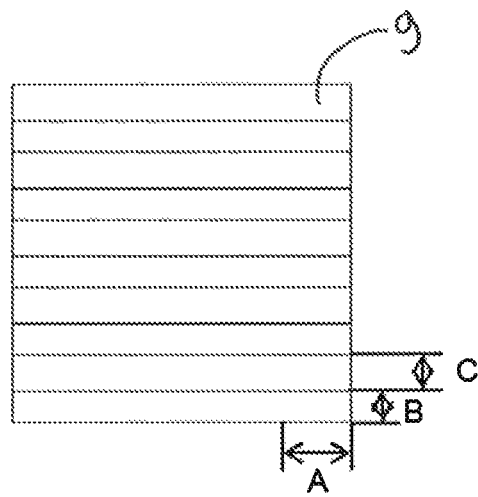
Figure 8B:
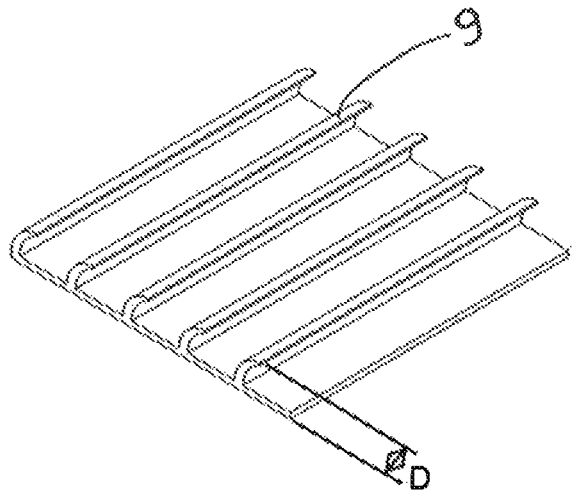

FIGS. 8a and 8b show a top view and an isometric view, respectively, of a set of microstructures 9 in the form of curved strips. In this case, too, each strip 9 is characterized by a length A, a width B and a height D. Each strip 9 is spaced apart from an adjacent strip by a distance C.

Figure 9A:
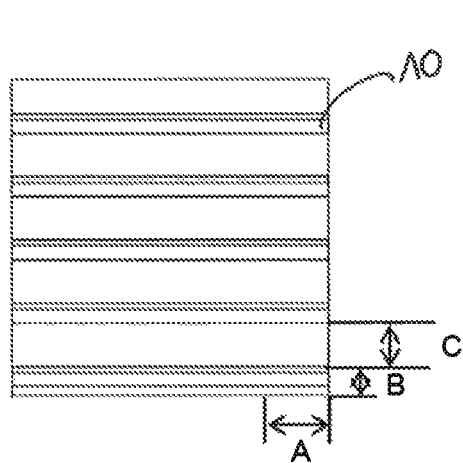
Figure 9B:
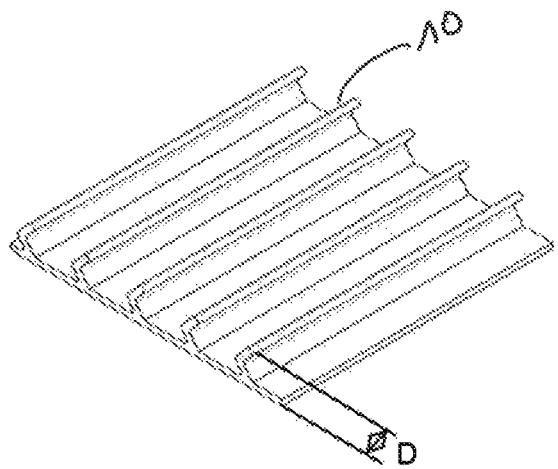

FIGS. 9a and 9b show a top view and an isometric view, respectively, of a set of microstructures 10 in the form of kinked strips. In this case, as well, each strip 10 is characterized by a length A, a width B and a height D. Each strip 10 is spaced apart from an adjacent strip by a distance C.

The microstructures in the form of strips 7, 8, 9, 10 described above with reference to FIGS. 7a to 7d, 8a and 8b, 9a and 9b are deformed plastically by bending under the effect of a stress.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A mould for a tire, comprising two shells that are each adapted to mould a lateral sidewall of the tire, a ring of sectors adapted to mould a tread of the tire, each sector of the ring of sectors comprising a radially inner face having a moulding lining, wherein the mould has microstructures that are configured to fill a clearance between two said moulding linings of adjacent sectors of the ring of sectors and/or between a moulding lining of one said sector and one of the two shells, when the mould is closed.

2. The mould for a tire according to claim 1, wherein the microstructures are arranged in a contact zone between two said linings of adjacent sectors and are secured to at least one of said linings of said sectors.

3. The mould for a tire according to claim 1, wherein the microstructures are arranged in a contact zone between a said lining of a said sector and a said shell and are secured to the lining of the sector and/or to the shell.

4. The mould for a tire according to claim 1, wherein said microstructures are produced by laser sintering.

5. The mould for a tire according to claim 4, wherein said microstructures are produced on a perimeter of the moulding lining.

6. The mould for a tire according to claim 1, wherein said microstructures are attached and fastened to the mould by fastening means.

7. The mould for a tire according to claim 6, wherein said microstructures are fastened by microwelding.

8. The mould for a tire according to claim 1, wherein the microstructures are configured to adapt to the profile of the clearance between two said linings of adjacent sectors and/or between a said lining of a said sector and a said shell.

9. The mould for a tire according to claim 1, wherein the microstructures are configured, on account of their shape, to be compressed under the effect of a stress.

10. The mould for a tire according to claim 9, wherein the shape of said microstructures is one of spikes, pyramids, squares and domes.

11. The mould for a tire according to claim 1, wherein the microstructures are configured, on account of their shape, to bend under the effect of a stress.

12. The mould for a tire according to claim 10, wherein the shape of said microstructures is one of curved strips, kinked strips and inclined strips.

* * * * *